INVENTOR.
IRVING BLEICHER
BY
Constantine A. Michalos
ATTORNEY

United States Patent Office 3,437,815
Patented Apr. 8, 1969

3,437,815
SOLID STATE SCANNING ARRANGEMENT FOR DETERMINING LOCATION OF A LIGHT SPOT ON A PANEL
Irving Bleicher, Fair Lawn, N.J., assignor to General Precision Inc., Little Falls, N.J., a corporation of Delaware
Filed Aug. 31, 1966, Ser. No. 576,358
Int. Cl. G01j 1/20
U.S. Cl. 250—203                                      9 Claims

ABSTRACT OF THE DISCLOSURE

System for determining location of distant light source using optical prism means to project the light on two detection panels disposed at right angles. The location of the spot on each panel formed by the projected light is determined by a plurality of conductors on the panels arranged in a special geometric pattern.

---

This invention relates to radiation detection apparatus and, more particularly, to devices for sensing the presence and the position of an image of a point source of radiation.

Heretofore, various devices have been used for accomplishing this task, including imaging devices such as image dissectors and vidicons or single photodetectors used in combination with a scanning mechanism. These devices were limited because they were basically analog devices which required frequent calibrations or require rotating components which usually were unreliable or the devices utilized vacuum tubes with thermionic filaments which usually required high voltages.

The detector means used in the present invention minimizes, to a large extent, the use of complicated electrical interconnections with various sensors which were necessary in the heretofore detecting means in order that the system properly perform its intended function. The present invention provides for a novel electroluminescent-photoconductor detector which requires no moving parts, using an opto-electronic approach of optimum simplicity, reliability, and economy in actuating a specially-constructed instrument by utilizing photoconductor means as a switching device actuated by cooperative illuminating means comprised of a directionally unknown point light source and a known solid state light source having electroluminescent panels.

Therefore, an object of this invention is to provide a novel radiation detector apparatus for sensing the presence and the position of an image of a point source radiation.

It is another object of this invention to provide a simple, completely solid-state, highly-reliable, electroluminescent-photoconductor optical sensor means for indicating the direction of a light source within an optical field-of-view being searched.

Another object of this invention is to provide a solid-state device for searching an optical field-of-view and to detect point light sources within the field in two directions by use of a novel opto-electronic detector system.

Figure 1:
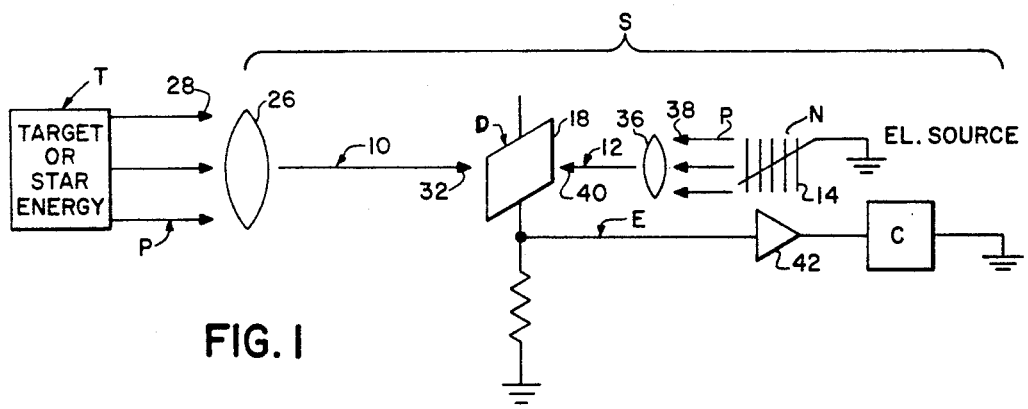
Figure 2:
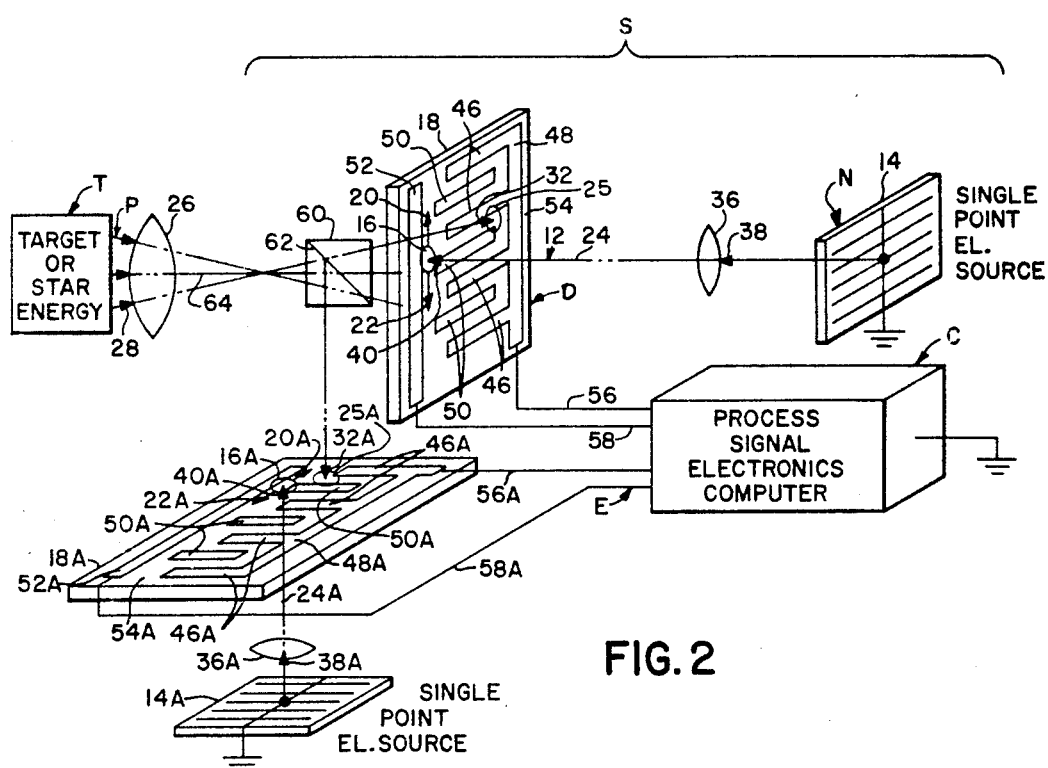
Figure 3:
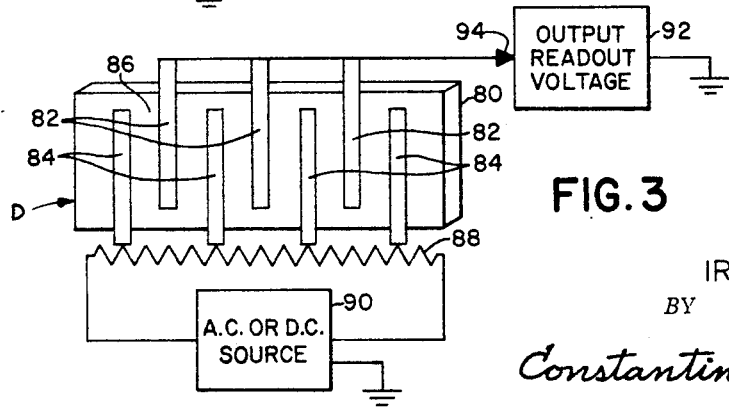

Further objects and advantages of the present invention will be specifically pointed out or will otherwise become apparent when referring for a better understanding of the invention, to the following description taken in conjunction with the accompanying drawings, wherein:
FIGURE 1 is a schematic of the overall device in accordance with a preferred embodiment of the invention;
FIGURE 2 is a schematic of a detailed configuration of the device in accordance with another embodiment of this invention; and
FIGURE 3 is a schematic of the device in accordance with still another embodiment of the invention.

Referring now to the drawing in general, it will be seen that a novel sensor or detector D described herein is part of a solid state star sensor S composed of a simple structure for processing light information received from a directionally unknown target or star energy T by utilizing a known electroluminescent light source N. The novel sensor or detector D employs two separate paths; a first path such as an optical path P, and a second path such as an electrical path E. The first or optical path P includes two parts; a means for optically directing the light signal from the target or star energy T, which direction is to be determined, and a means for optically directing the light signal from the known light source N. The second, or electrical path E, provides for the electrical conversion of the two light signals. Therefore, depending on the illuminating pattern, the optical or first path P presents to the detector D, the detector D will produce a so-called switching means to energize its electrical or second path E for directing information to an output external process signal electronics computer C and thereby determine the position of the target or star energy light signal T within an optical field being viewed.

In detail, the main feature of this invention is the solid state detector D which includes means for processing the optical path P having two electrical paths, a light path 10 from the star or target T which direction is to be determined and a directionally known electroluminescent light path 12 from the known light signal source N. As shown in FIGURE 2, the electroluminescent light path 12 is produced by digitally exciting an electroluminescent panel 14 for sequentially focusing a spot of light 16, as shown by arrows 20 and 22, in positions along a specially constructed detector panel 18 of the detector D.

The known electroluminescent path 12 is also divided into two parts; a first directional electroluminescent path 24, and a second directional electroluminescent path 24A which extends 90° to the first directional electroluminescent path 24. Inasmuch as the two electroluminescent paths 24 and 24A are substantially identical, only one electroluminescent path 24 will be described and duplicate numbers with the suffix letter A are applied to the corresponding elements of the other electroluminescent path 24A.

Referring particularly to the structure found in the optical path P, it will be seen that light from the target or star T is directed to the detector panel 18 to form a light spot 25. The sensor S physically includes an objective lens 26 focusing the light spot 25 from the star or target T, as shown by arrow 28, to the detector panel 18, as shown by arrow 32. In addition, the optical path P includes light from the star sensors sequentially scanning single point electroluminescent light source panel 14, which is focused by a lens 36, as shown by arrow 38, to the back of the detector 18, as shown by arrow 40. When the star T is detected, a signal is generated by the detector panel 18 which is applied to the electrical path E, amplified by an amplifier 42 and then presented to the computer C which may be a readout device such as a process signal electronics computer.

Therefore, the sensor S, as shown in detail in FIGURE 2, primarily comprises the two electroluminescent light paths 24 and 24A. The electroluminescent path 24, which is substantially the same as the electroluminescent path 24A, includes the specially constructed detector panel 18, which comprises a first plurality of parallel gold leaf electrical conductors 46 closely spaced and extending in one direction, having one end connected by a common electrical conductor 48, and a second plurality of parallel gold leaf electrical conductors 50, closely spaced and extending parallel to the first plurality of electrical conductors 46. Each conductor 50 is interposed between a pair of conductors 46 of the first plurality of conductors. In addition, the detector panel 18 includes another gold leaf electrical conductor 52 extending transverse to, and spaced from, the parallel conductors 50. It should be noted that both plurality of conductors 46 and 50 with the transverse conductors 48 and 52 are embedded in photoconductive material 54 within the detector panel 18.

Specifically, the photoconductor material 54 may be of cadmium sulfide (CdS) or cadmium selenide (CdSe) which is evaporated over the gold leaf conductors 46, 48, 50 and 52. Wire conductors 56 and 58 are then connected to the gold leaf conductors 52 and 48 to provide a connection to the output external process signal electronics computer C.

The second light path 24A is directed to second detector panel 18A by means of a beam splitting prism 60 having a partially-reflective surface 62 which makes a forty-five degree angle with respect to an optical axis 64 of the lens 26, which axis is perpendicular to the detector panel 18. This prism 60 permits the light from the star T to be directed to both detector panels 18 and 18A.

In the operation of the system of FIGURES 1 and 2, in order to obtain current flow or signal to the computer C, two paths must be closed simultaneously. There must be a connection between two adjacent parallel conductors 46 and 50 by the star T directing the light spot 25 onto the photoconductive material 54 and also a connection between the common conductor 52 and one of the conductors 50 by the electroluminescent panel 14 directing the light spot 16 onto the photoconductive material 54. That is, the star energy T serves to provide to the detector D the first electrical switching by producing a low impedance within the photoconductive material 54 between the pair of conductors 46 and 50, while the electroluminescent panel 14 provides the second electrical switching by producing a low impedance within the photoconductive material 54 between the common conductor 52 and the conductors 50. That is, since the photoconductor is an insulator in the dark and a low impedance when illuminated, when the star energy is focused onto the photoconductive material to produce the light spot 25, a low impedance path is provided between a pair of conductors of the conductors 46 and 50. However, even though the conductors 46 and 50 are connected, current cannot flow between these conductors until another path is closed. This second path is provided by the electroluminescent panel light source which generates the point source of light 16. By digitally exciting the electroluminescent panel along a line shown by the arrows 20 and 22, the spot 16 sequentially is focused on positions adjacent each conductor 50 on the detector panel 18, shown in FIGURE 2. Since the light falls on photoconductive material to produce the spot 16, a low resistance path from the sampled conductor of the series of conductors 50 to the common conductor 52 is provided. A current pulse is, therefore, only generated when the electroluminescent panel light source falls on the same conductive element as does the star energy light. By controlling and knowing the position of the electroluminescent source, it is possible to determine the position of the star source within the optical field-of-view being searched by the computer C receiving this information through the electrical path E.

In the process of making the conductor panels 18 and 18A of the detector D, it should be noted that instead of evaporating the gold conductive elements 46 and 50, grid lines may be obtained in an alternated manner by utilizing a mask constructed with transparent and opaque strips corresponding to the conductive strip pattern of said conductors. That is, a photoconductive material only is deposited on the glass substrate and the mask is illuminated by a light source and imaged on the detector, then conductive strips are formed on the photoconductor material.

Therefore, the main feature of this device shown in FIGURES 1 and 2 is the use of a novel detector D in combination with a unique method of utilizing star energy light, and an auxiliary light such as light from an electroluminescent panel to function as an input source to energize actuator switches composed of photoconductive material located between electrical conductors to provide digital outputs for detecting the location of the star within an optical field-of-view being searched.

As shown in FIGURE 2, by using a beam splitter 60 and an additional detector 18A, two axis information is obtained. That is, in the same manner described for the detector panel 18, the detector panel 18A can operate to provide information to the process signal electronics computer C.

In the embodiment of the invention shown in FIGURE 3, in place of the detector panel 18, the detector D is comprised of a detector panel 80 having a plurality of electrical conductors 82 and 84 embedded in photoconductive material 86, such as the electrical conductors 50 and 46 of the device shown in FIGURE 2, being embedded in the photoconductive material 54, for receiving a point of light from a star, such as star T of FIGURE 2. Therefore, the conductors 82 and 84 may be electrically connected by the switching action of the unknown point light source such as from the star T being directed on the photoconductive material 86 as in the electrical conductors 46 and 50 of the detector panel 18, shown in FIGURE 2. However, in place of the common electrical conductor 52 and the electroluminescent panel 14, the device of FIGURE 3 includes a resistor element 88 connecting all of the conductors 84 at one end. In addition, the device of FIGURE 3 includes a source of current 90 which may be an alternating current or direct current source, connected to the two ends of the resistor element 88. When a light from a star T is directed on the photoconductive material 86, there will be a switching effect to connect two adjacent conductors to permit current to flow from the source 90 through the resistor 88, through one of the line conductors 84 to one of the conductors 82, depending on the location of the light from the star. The output will then be directed to an output readout voltage computer 92, as shown by arrow 94.

Therefore, the operation of the system of FIGURE 3 is substantially the same as that of FIGURE 2 except that, in place of the two photoconductive switching paths, the detector D of FIGURE 3 has one photoconductive switching path and one resistor path. When the point light, directed from the star T moves along the photoconductive path from right to left, as viewed in FIGURE 3, the current to the output readout voltage 92 decreases; but when the switching progresses from left to right, the current to the output readout voltage computer 92 increases, thereby locating the position of the point of light of the star T in the field-of-view being searched. A two directional information may be obtained by using two detector panels, such as the detector panel 80, and a beam splitter, as described in the device of FIGURE 2.

While the present invention has been described in preferred embodiments, it will be obvious to those skilled in the art that various modifications can be made therein within the scope of the invention, and it is intended that the appended claims cover all such modifications.

What is claimed is:

1. In a device for sensing the presence and the position of an image of a point radiation source within an optical field-of-view being searched including a detector means having, a first plurality of spaced, elongated, substantially parallel, electrically interconnected conductors, a second plurality of spaced, elongated, substantially parallel conductors, each conductor of said second plurality of conductors being interposed between and closely spaced from the conductors of said first plurality of conductors, radiosensitive material interposed between each conductor of said first and second plurality of conductors for receiving the point radiation from said source operably producing a first connection and thereby a first switching between particular adjacent conductors of said first and second plurality of conductors, depending on the position of the image of the point radiation incident upon said detector means, and a controlled means operably reading the location of the point radiation incident upon said detector for determining the position of the image of the point radiation within the optical field-of-view being searched, the improvement therein wherein said detector means further comprises an elongated conductor supported in the radiosensitive material transverse to and adjacent one end of each of the conductors of said second plurality of conductors, and said controlled means operably directs radiation onto the radiosensitive material between said transverse conductor and each end of the conductors of said second plurality of conductors, operably producing a second connection and thereby a second switching between a conductor of said second plurality of conductors and said transverse conductor for completing a signal path whereby knowing the position of the controlled radiation, the position of the point radiation within the optical field-of-view can be determined.

2. The structure defined by claim 1, wherein said detector means further comprises a resistor element interconnecting at intermediate positions along its length one end of each conductor of said second plurality of conductors, and means for directing current flow through said resistor element and through the conductors for producing a signal depending on the location of the point radiation incident upon said detector means proportional to the current and thereby determining the position of the image of the point radiation within the optical field-of-view being searched.

3. The structure defined by claim 1, wherein the conductors of said first and second plurality of conductors and said transverse conductor are evaporated gold leaf electrical conductors embedded in the radiosensitive material.

4. The structure defined by claim 1, wherein the radiosensitive material is photoconductive and said conductors of said first and second plurality of conductors and said transverse conductor are grid lines obtained by directing a light through a mask constructed with transparent and opaque strips corresponding to the contrapositive of the conductive strip pattern of said conductors.

5. The structure defined by claim 1, further comprising a process signal electronics computer operably connected to conductors of said first and second plurality of conductors switched-on by said point radiation and said controlled radiation for receiving flow signals and thereby locating the position of said point radiation within the optical field-of-view being searched.

6. The structure defined by claim 1, wherein said point radiation is a light, such as from a star in a field-of-view being searched, said conductors are of electrical conductive material, and said radiosensitive material being of photoconductive material, and further comprising means for projecting the image of said light along said conductors for bridging a pair of conductors, one of said first plurality of conductors with one of said second plurality of conductors, and said controlled means including an electroluminescent light scanning means directed onto the photoconductive material between said transverse conductor and the ends of the conductors of said second plurality of conductors for connecting said conductors and thereby presenting the position of the light image upon said detector and whereby the position of said light within the optical field-of-view being searched can be detected.

7. The structure of claim 1, wherein said detector means includes a third plurality of spaced, elongated, substantially parallel, electrically interconnected conductors extending at right angles and transverse to said first plurality of conductors, a fourth plurality of spaced, elongated, substantially parallel conductors, each conductor of said fourth plurality of conductors being interposed between and closely spaced from the conductors of said third plurality of conductors, radiosensitive material interposed between each conductor of said third and said fourth plurality of conductors, and a beam splitter including a partially-reflective surface extending at a forty-five degree angle with respect to said first and second plurality of conductors and at a forty-five degree angle with respect to said third and fourth plurality of conductors, whereby the image from the point radiation is directed through the partially-reflective surface of said beam splitter to said first and second plurality conductors for determining the position of said point radiation in one direction and the image from the point radiation is reflected by the partially-reflective surface of said beam splitter to said third and fourth plurality conductors for determining the position of said point radiation in another direction transverse to the first direction.

8. The structure of claim 1, wherein said detector means includes a detector panel comprising an optical path and an electrical path, said electrical path including the first and second plurality of conductors with said radiosensitive material therebetween being of photoconductive constituent forming with each of said conductors a first plurality of possible switching locations and the second plurality of said transverse conductors with said radiosensitive material therebetween being of photoconductive constituent forming between the transverse conductor and each of the conductors of said second plurality of conductors a second plurality of possible switching locations, and said optical means including the images of point radiation wherein said point radiation being from a star light projected onto the photoconductive material between said first and second plurality of conductors for producing the first connection and the first switching between adjacent conductors of said first and second plurality of conductors depending on the position of the star light image on the detector, and the controlled means comprising an electroluminescent means selectively directing light onto the photoconductive material between the transverse conductor and each of the conductors of said plurality of conductors for producing the second connection and thereby the second switching between the transverse conductor and one of the conductors of said second plurality of conductors switched-on by the first switching and thereby permitting a continuity between the switched-on conductors, and a process signal electronics computer means for directing and receiving a current flow through the switched-on conductors for determining the location of the light image on said detector and thereby the position of said star within the optical field-of-view being searched.

9. The structure of claim 8, wherein said detector means includes a second detector panel substantially the same as said first detector panel extending perpendicular to said first detector panel with the conductors in a ninety degree angle to the conductors of said first detector panel and a beam splitter including, a partially-reflective surface extending at a forty-five degree angle with respect to said first detector panel and at a forty-five degree angle with respect to said second detector panel, whereby the image from the star light is directed through the partially-reflective surface of said beam splitter to said first detector for determining the position of the star light in one direction and the image from the star light is reflected by the partially-reflective surface of said beam splitter to said second detector for determining the position of said star light in another direction transverse to the first direction.

References Cited

UNITED STATES PATENTS

| | | | |
|---|---|---|---|
| 3,102,970 | 9/1963 | Haskell et al. | 315—153 |
| 3,214,595 | 10/1965 | Johnson et al. | 250—209 X |
| 3,244,889 | 4/1966 | Preston et al. | 250—203 X |
| 3,274,388 | 9/1966 | Distel | 250—203 X |
| 3,312,825 | 4/1967 | Robinson | 250—213 |
| 3,351,763 | 11/1967 | Shuart | 250—209 |

JAMES W. LAWRENCE, Primary Examiner.

C. R. CAMPBELL, Assistant Examiner.

U.S. Cl. X.R.

250—209, 211, 213; 315—153; 317—311